United States Patent [19]

Virtanen et al.

[11] Patent Number: 5,141,753
[45] Date of Patent: Aug. 25, 1992

[54] METHOD FOR UTILIZING THE COPPER-ARSENIC PRECIPITATE CREATED IN THE ELECTROYTIC REFINING OF COPPER IN THE PRODUCTION OF ANTI-ROT AGENTS FOR WOOD

[75] Inventors: Henri K. Virtanen; Leo E. Lindroos, both of Pori, Finland

[73] Assignee: Outokumpu Oy, Helsinki, Finland

[21] Appl. No.: 724,386

[22] Filed: Jun. 28, 1991

[30] Foreign Application Priority Data

Jul. 2, 1990 [FI] Finland .................................. 903323

[51] Int. Cl.$^5$ .............................................. B27K 3/32
[52] U.S. Cl. .................................... 424/617; 424/622; 424/623; 204/93; 204/97; 204/98; 204/112; 423/23; 423/53; 423/87; 423/138; 423/595; 423/602; 423/604
[58] Field of Search ................... 424/617, 622, 623; 252/519, 387, 397, 398; 204/86, 92, 93, 96, 97, 98, 112; 423/23, 53, 87, 138, 592, 595, 602, 604

[56] References Cited

U.S. PATENT DOCUMENTS

| 4,103,000 | 7/1978 | Hartford | 424/623 |
| 4,369,164 | 1/1983 | Monk | 423/602 |
| 4,961,909 | 10/1990 | Boateng | 423/602 |

Primary Examiner—Nathan M. Nutter
Attorney, Agent, or Firm—Brooks Haidt Haffner & Delahunty

[57] ABSTRACT

The invention relates to a method for producing wood anti-rot agent of the copper-arsenic precipitate created in the solution purification of copper electrolysis, or of some other corresponding precipitate.

6 Claims, 3 Drawing Sheets

METHOD FOR UTILIZING THE COPPER-ARSENIC PRECIPITATE CREATED IN THE ELECTROYTIC REFINING OF COPPER IN THE PRODUCTION OF ANTI-ROT AGENTS FOR WOOD

The present invention relates to a method for utilizing the copper-arsenic precipitate, or other corresponding precipitate created in the solution purification of copper electrolysis, in the production of anti-rot agents for wood.

In the electrolytic refining of copper, the anode copper used as raw material contains varying amounts of different impurities, such as arsenic and nickel. While leaching anode copper, the said impurities behave in principle in two ways: those that are less precious than copper are dissolved, and those that are more precious remain undissolved, forming a so-called anode slime. Part of the soluble impurities form compounds that are insoluble to the electrolyte, in which case they are also precipitated along with the slime. Some soluble impurities, however, remain soluble in the electrolyte, and in order to prevent their concentration, they must be removed from the electrolyte. Such partly soluble and thus removable impurities are among others arsenic and nickel.

The solution purification process generally used in copper electrolysis includes two stages, copper extraction electrolysis and solution concentration.

In copper extraction electrolysis, the copper contained in the electrolyte to be purified is electrolytically precipitated. In the final stage of the copper extraction electrolysis, when the copper content of the solution has decreased sufficiently low, arsenic is also reduced from the solution. Arsenic is precipitated, along with the copper, as various copper-arsenic compounds.

The copper-free solution obtained from the copper extraction electrolysis is concentrated in the next stage of solution purification. Now various metal sulphates that are insoluble to concentrated sulphuric acid, such as nickel sulphate, are precipitated from the solution. The concentrated sulphuric acid solution can be returned to electrolysis. This concentrated sulphuric acid solution can also include varying contents of arsenic.

Traditionally the copper-arsenic precipitate obtained from the copper extraction electrolysis is returned to the copper smelter because of its copper content. Then it creates, however, a remarkable arsenic circulation in between the smelter and the electrolysis. The only way to restrict the circulation has been the removal of the precipitate from the circulation by storing it. The precipitate has become a major problem in smelters which use concentrates that already contain large amounts of arsenic.

By employing the method of the present invention, the copper-arsenic precipitate obtained from copper extraction electrolysis can be utilized in the production of anti-rot agents for wood. The anti-rot agents referred to in this context generally contain copper, arsenic and chromium. Anti-rot agents are commercially utilized sales items. The essential novel features of the invention are apparent from the appended patent claims.

Traditionally the copper and arsenic raw material used in the production of anti-rot agents has been copper oxide, copper arsenate and arsenic acid made of arsenic trioxide. In the method of the present invention, all of the copper and part of the arsenic is obtained from the copper-arsenic precipitate created as a side product from copper electrolysis.

In the method of the invention, the copper-arsenic precipitate is leached by oxidation either into a sulphuric acid or arsenic acid solution, resulting in copper sulphate and/or copper arsenate solution. In sulphuric acid leaching, the above mentioned concentrated sulphuric acid solution can be utilized. The leaching is carried out at a raised temperature, either in normal pressure, or in an increased pressure in an autoclave. When the dissolution takes place in atmospheric conditions, the temperature remains within the range 80°–105° C., and in an autoclave within 105°–170° C. The presence of sulphate is essential in the dissolution taking place in normal pressure. The employed oxidant can be oxygen, but other oxidants such as air or hydrogen peroxide can also be used. The following reactions take place:

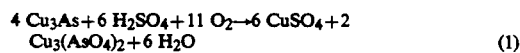

$$4\ Cu_3As + 6\ H_2SO_4 + 11\ O_2 \rightarrow 6\ CuSO_4 + 2\ Cu_3(AsO_4)_2 + 6\ H_2O \quad (1)$$

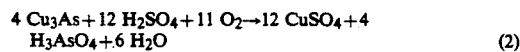

$$4\ Cu_3As + 12\ H_2SO_4 + 11\ O_2 \rightarrow 12\ CuSO_4 + 4\ H_3AsO_4 + 6\ H_2O \quad (2)$$

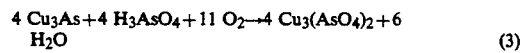

$$4\ Cu_3As + 4\ H_3AsO_4 + 11\ O_2 \rightarrow 4\ Cu_3(AsO_4)_2 + 6\ H_2O \quad (3)$$

BRIEF DESCRIPTION OF THE DRAWINGS

The invention is also described by means of the appended flowcharts, where.

Figure 1:
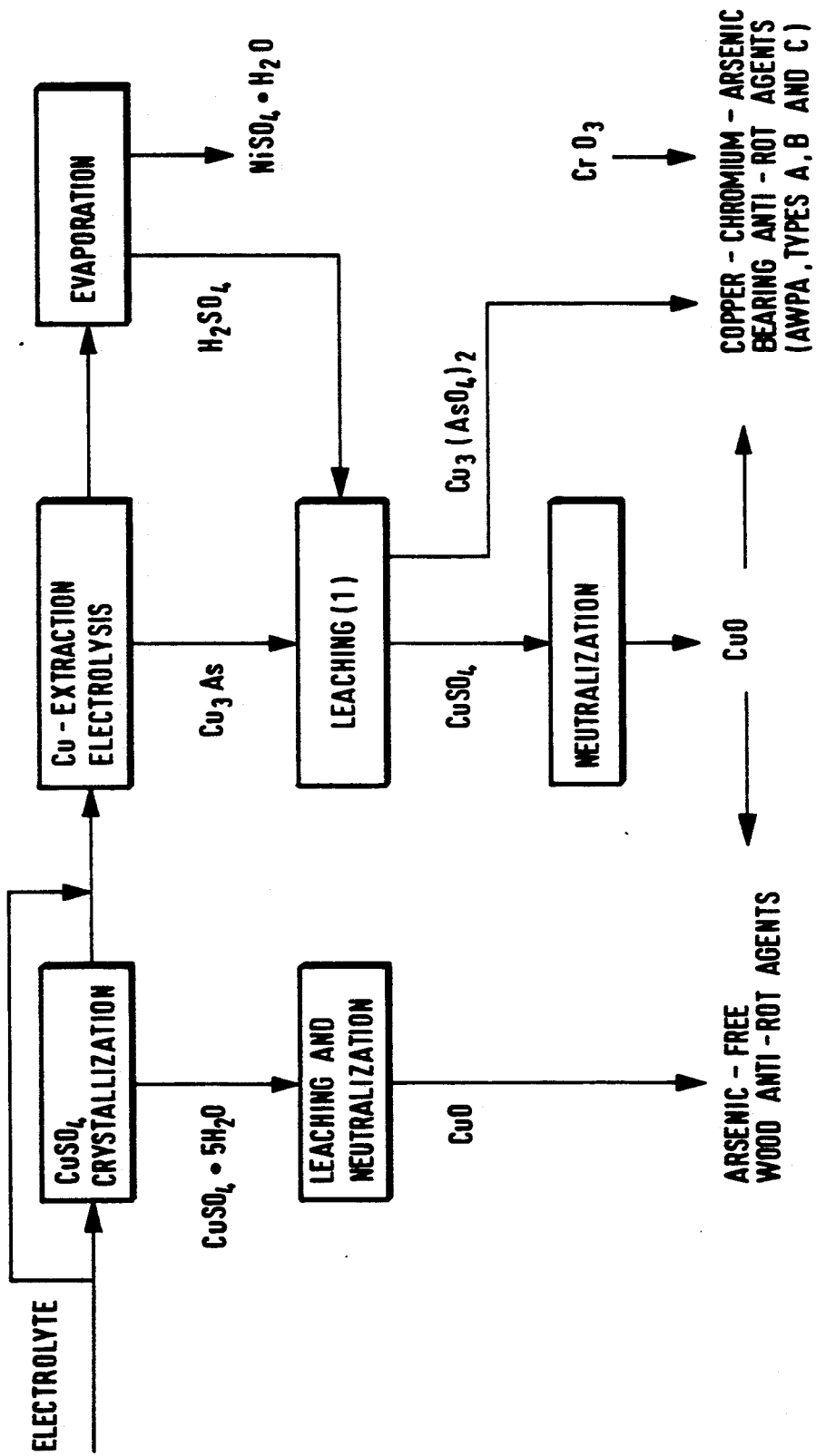
FIG. 1 represents a flowchart according to the reaction equation (1)
Figure 2:
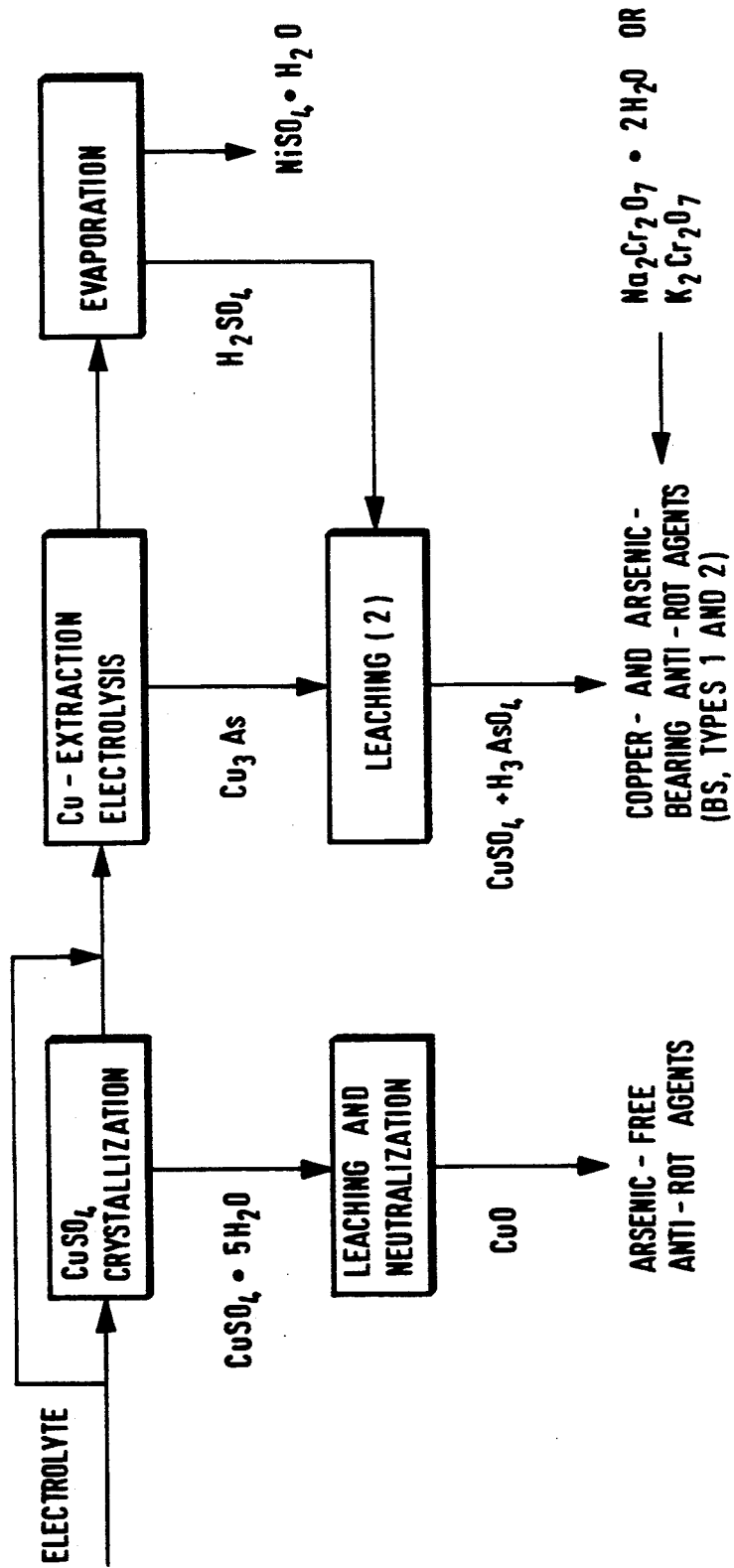
FIG. 2 represents a flowchart according to the reaction equation (2)
Figure 3:
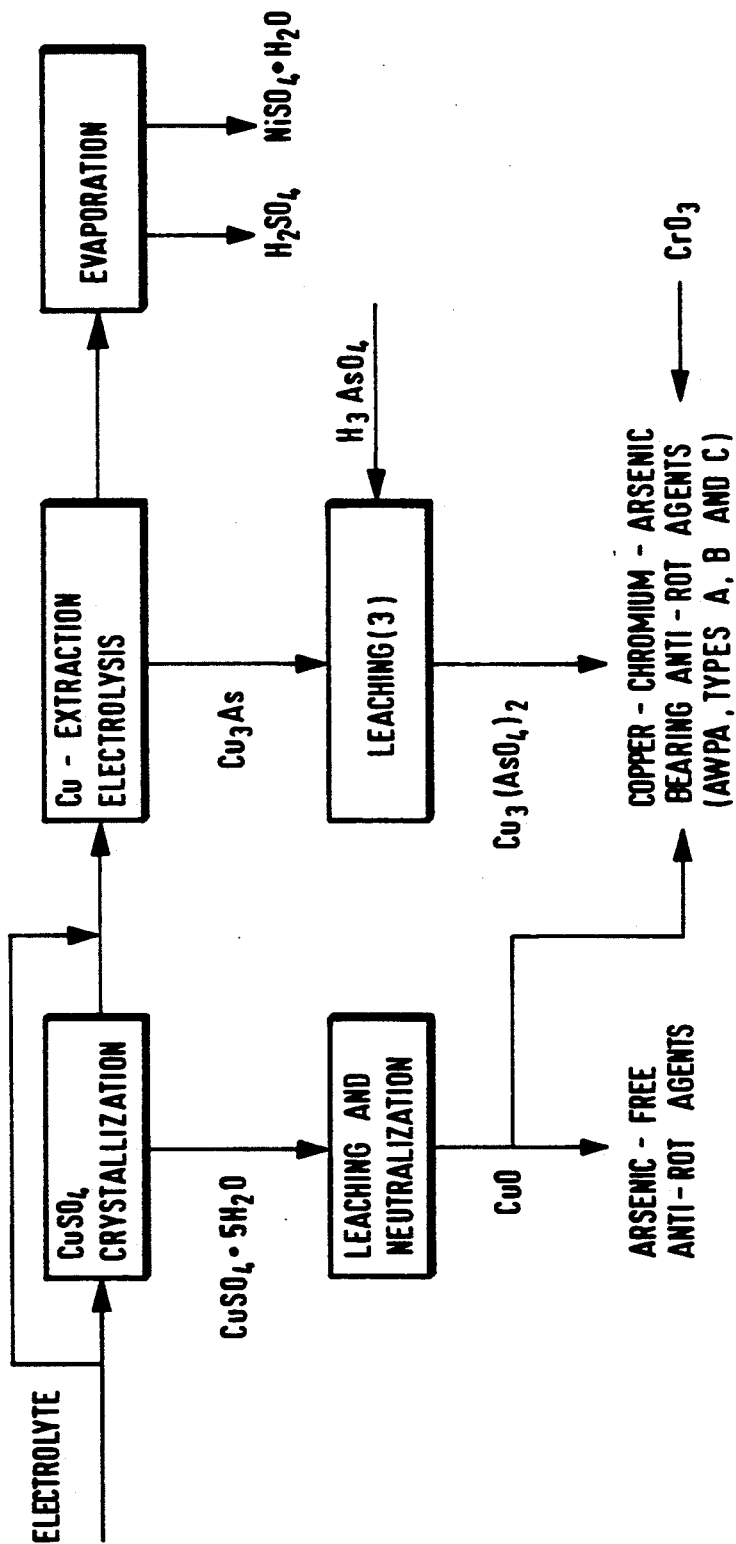
FIG. 3 represents a flowchart according to the reaction equation (3).

According to the flowcharts, at least part of the electrolyte applied in the solution purification of copper electrolyte can be first crystallized into hydrated copper sulphate. When the thus obtained copper sulphate is leached into water and the solution is neutralized with lye, there is precipitated, at a raised temperature, copper oxide which can be separated and used as such in the production of arsenic-free wood anti-rot agents, or as an additive in the production of for instance copper-chromium arsenate paste. After the crystallization of copper sulphate, the electrolyte is subjected to a copper extraction electrolysis, wherefrom the copper-arsenic precipitate used in the method of the invention is obtained. As was mentioned above, by evaporating the copper-free solution there is obtained concentrated sulphuric acid and metal sulphates, such as nickel sulphate, which are insoluble to sulphuric acid.

By dissolving the copper-arsenic precipitate according to the equation (1), there is obtained a solution which contains copper sulphate and copper arsenate. When the pH of the solution is adjusted within the range of 2–3, the copper arsenate can be precipitated. Then the copper arsenate is separated from the mother liquor.

From the mother liquor, which in this case is a copper sulphate solution, there is produced copper oxide by neutralizing the solution with lye at a raised temperature. The obtained copper oxide is separated from the sodium sulphate solution. Copper oxide can be used as a raw material in all copper-bearing anti-rot agents. These include the traditional anti-rot solutions and pastes containing copper, chromium and arsenic, but also arsenic-free anti-rot solutions.

Copper arsenate also is suited as a raw material for all wood anti-rot agents containing copper, chromium and arsenic. While using it, arsenic acid must be added into the process for the precision of the arsenic balance, and chromium acid is naturally added at the same time. The analysis of one such wood anti-rot solution concentrate is as follows: CuO 10.3%, $CrO_3$ 26.8% and $As_2O_5$ 22.7%. The concentrate contains 900 g/l of the said salt.

The arsenic acid bearing copper sulphate solution of equation (2) can as such be used in the production of sulphate-based wood anti-rot agents containing copper, chromium or arsenic. In that case the copper sulphate and arsenic acid contents of the solution are adjusted for precision, and sodium dichromate is added to the solution as the third effective agent. The analysis of one such wood anti-rot agent is as follows: $CuSO_4.5H_2O$ 35%, $Na_2Cr_2O_7.2H_2O$ 45%, and $As_2O_5.2H_2O$ 20%. Instead of sodium dichromate, it is also possible to use potassium dichromate $K_2Cr_2O_7$.

By leaching the copper-arsenic precipitate created in the copper extraction electrolysis by oxidation into the arsenic acid solution, also containing a small amount, at least 10 g/l, advantageously over 20 g/l sulphate, according to equation (3), there can be directly produced wood anti-rot agents containing copper, chromium and arsenic. Now the amount of arsenic acid added in the leaching stage already corresponds to the amount required by the final product. After the chromium acid addition, there is carried out the precipitation of lead possibly required by the final product.

By arsenic acid leaching, there can also be produced wood anti-rot paste. In that case copper oxide is added to the dissolution charge after the chromium acid addition, in order to obtain the right composition for the product. The nominal composition of one such paste is as follows: CuO 19.6%, $CrO_3$ 35.3%, $As_2O_5$ 45.1%.

All anti-rot agents produced according to the invention conform either to the types A, B or C of the standard P5 of the American Wood Preservers' Association (AWPA) or to the types 1 or 2 of the British Standard BS 4072.

The invention is further described with reference to the appended examples:

EXAMPLE 1

In the electrolytic copper extraction of a copper electrolysis plant, there was precipitated a precipitate containing copper and arsenic. The analysis of the precipitate was: Cu 65%, As 25%, Sb 2.5%, Bi 0.9%, Pb 0.03%, and Cl 0.04%. The precipitate was in an electrolysis solution, which was diluted with water. The precipitate content of the solution was 800 g/l. The amount of free sulphuric acid contained in the solution was 60 g/l, and the amount of copper was 0.2 g/l.

The amount of slurry charged into the dissolution reactor was 6.5 $m^3$. There was also charged 5.2 $m^3$ arsenic acid into the reactor. The arsenic content ($As^{5+}$) of the arsenic acid was 869 g/l. By using a water addition, the volume was adjusted to precision as 12 $m^3$.

The reactor was provided with a mixer where the oxygen used as the oxidant was fed into the reactor through the impeller shaft. The charge was heated up to 100° C., and then oxidized for 15 hours with oxygen. The oxygen supply rate was 90 $Nm^3/h$. During oxidation, the reaction (3) took place. The solution stage contained an excess of arsenic acid, and some sulphuric acid.

When the reaction was over, the charge was shifted to another mixing reactor, where chromium acid flakes ($CrO_3$) were added to the charge. By means of a water addition, the volume of the charge was increased to 45 $m^3$. During the mixing, the temperature of the charge was about 50° C. The precipitate was allowed to settle on the bottom of the reactor. From the reactor, there was obtained 43 $m^3$ clarified wood anti-rot agent. The analysis of the solution was: Cu 75 g/l, As 127 g/l, Cr 130 g/l, Pb 145 mg/l, $H_2SO_4$ 8 g/l. The specific weight of the solution was 1.42 kg/l.

The obtained solution is a ready wood anti-rot agent in concentrate form. The solution concentrate contains 900 g/l of so-called salt. The analysis of the salt is: CuO 10.3%, $CrO_3$ 26.8%, and $As_2O_3$ 22.7%.

The obtained solution was subjected to a dilution test. In the test, the solution was diluted with water, so that the diluted solution contained 25 g/l of the so-called salt. This solution remained clear for 24 h at the temperature of 20° C.

The precipitate remained in the reactor can be mixed to the following charge. When the amount of accumulated precipitate is sufficient, it is filtered out.

EXAMPLE 2

Into an autoclave there was charged 3120 g of copper-arsenic precipitate. The analysis of the precipitate was: Cu 55%, As 35%, Sb 0.5%, Bi 0.2%, and Pb 0.01%. In addition to the precipitate, into the autoclave there was charged 3910 g arsenic trioxide, the analysis whereof was As 74.8%, Sb 0.1% and Ca 0.05%. Concentrated sulphuric acid was added 280 ml, and activated carbon 2 g.

The whole solution volume of the charge was 8 l. The precipitate charge was leached in the autoclave for 5 h at the temperature of 160° C. The total pressure in the autoclave was 8 atm. The total amount of oxygen fed into the autoclave during the dissolution was 1.3 $Nm^3$.

At the end of the leaching process, the charge was removed from the autoclave and cooled, and 4800 g chromium acid flakes was added thereto. The final volume of the charge was 9.6 l.

The precipitate of the charge was allowed to settle at 60° C. The amount of obtained clarified solution was 8 l. The feculent solution was removed and used separately in the production of wood anti-rot solution. The analysis of the clear solution was: CuO 10.72%, $CrO_3$ 24.15%, and $As_2O_5$ 30.80%. The specific weight of the solution was 2.05 kg/l.

Into the solution there was added, at 30° C., 440 g copper oxide, and the mixture was mixed for 12 h. The final analysis of the solution was: CuO 13.42%, $CrO_3$ 23.95%, and $As_2O_5$ 30.61%. The specific weight of the solution was 2.07 kg/l.

The obtained product corresponds to a product according to the AWPA, known by the name type B. The nominal composition of the type B is: CuO 19.6%, $CrO_3$ 35.3%, $As_2O_5$ 45 1%. The amount of these effective agents contained in the product manufactured above was 68%. In the dilution test the solution remained clear.

EXAMPLE 3

An amount of 370 kg copper arsenic precipitate, its analysis being Cu 70% and As 20%, was charged into a reactor. To the same reactor there was also charged 230

1 70% sulphuric acid, which was obtained from the evaporation of the copper-free electrolyte. The amount of free sulphuric acid contained in the sulphuric acid was 1100 g/l, and the amount of pentavalent arsenic was 70 g/l. The total volume of the charge was 2.3 m$^3$.

The solution charge was oxidized with oxygen at the temperature of 100° C. After oxidation, from the charge there was separated 2.08 m$^3$ of copper sulphate solution, its analysis being Cu 80 g/l and SO$_4$ 120 g/l. The amount of obtained copper arsenate slurry was 280 dm$^3$. The slurry contained Cu 338 g/l, As 288 g/l and SO$_4$ 38 g/l.

Into the slurry there was mixed 317 kg chromium acid flakes, and 84 dm$^3$ arsenic acid. The As$^{5+}$ content of the arsenic acid was 500 g/l. The analysis of the final product was Cu 68 g/l, As 92.8 g/l, Cr 118 g/l and SO$_4$ 7.4 g/l. The volume of the solution was 1.39 m$^3$. By decanting this solution charge, there was obtained 1.30 m$^3$ of clear wood anti-rot agent.

The copper sulphate solution was neutralized with lye. As a result, there was obtained precipitated copper oxide, which was separated from the mother liquor as slurry. The remaining product was pure sodium sulphate solution. The amount of obtained copper oxide slurry was 330 dm$^3$, and the copper content of the slurry was 500 g/l.

Into the obtained slurry, there was mixed 303 kg phosporic acid (80% P$_2$O$_5$) and 290 kg chromium acid (CrO$_3$). The obtained final product was wood anti-rot agent containing 900 g/l of the effective agent. The composition of the effective agent was: CuO 15%, P$_2$O$_5$ 17.6%, and CrO$_3$ 21%. The volume of the solution was 1.53 m$^3$.

Both final products remained clear in the dilution test.

EXAMPLE 4

Into a solution reactor there was charged 11.4 kg impure copper powder. The analysis of the copper powder was: Cu 85%, As 7%, Sb 2%, Pb 1% and Bi 1%. Into the reactor there was also added 30.7 dm$^3$ of a mixture of arsenic acid and sulphuric acid, the content of the pentavalent arsenic thereof being 384 g/l, and the content of free sulphuric acid being 485 g/l.

The charge was leached by means of oxygen at the temperature of 96° C. The insoluble precipitate was separated from the solution. The analysis of the solution was: Cu 120 g/l, As 157 g/l, and SO$_4$ 185 g/l. The volume of the solution was 81 dm$^3$.

The solution was concentrated to a final weight 61.4 kg. At the temperature of 30°–35° C. there was added into the solution 50.2 kg of the Na$_2$Cr$_2$O$_7$.2H$_2$O salt, and the amount of obtained final product was 111.6 kg. The composition of the final product was: CuSO$_4$.5H$_2$O 35.1%, Na$_2$Cr$_2$O$_7$.2H$_2$O 44.9%, and As$_2$O$_5$.2H$_2$O 20.1%. In composition the product corresponds to the woods anti-rot paste of the type 2 according to the British Standard. In the dilution test the solution remained clear.

We claim:

1. A method for producing wood anti-rot agents, such as solutions and pastes, containing at least copper and arsenic wherein the employed raw material is the copper-arsenic precipitate produced in the purification of the electrolyte of copper electrolysis, comprising leaching said precipitate at temperatures between 80–°170° C., by using oxygen as an oxidant, into arsenic acid.

2. The method of claim 1, wherein the copper-arsenic precipitate is leached with sulphuric acid at temperatures between 80°–105° C. in atmospheric conditions in the presence of sulphate, so that the solution contains at least 10 g/l sulphate.

3. The method of claim 1, wherein the copper-arsenic precipitate is leached at a temperature between 105°–170° C.

4. The method of claims 1, 2 or 3 wherein the copper-arsenic precipitate is leached into a concentrated arsenic acid to produce copper arsenate and arsenic acid solution, so that by adding chromium acid to the copper arsenate and arsenic acid solution there is produced a wood anti-rot agent containing copper, chromium and arsenic.

5. The method of claims 1, 2 or 3 for producing wood anti-rot paste, wherein the copper-arsenic precipitate is leached, by using oxygen as the oxidant, into arsenic acid to produce copper arsenate and arsenic acid solution, and to the copper arsenate and arsenic acid solution there is first added chromium acid, and to the clarified solution there is added copper oxide in order to produce a wood anti-rot paste containing copper, chromium and arsenic.

6. The method of claim 2 wherein the solution contains over 20 g/l sulphate.

* * * * *

UNITED STATES PATENT AND TRADEMARK OFFICE
CERTIFICATE OF CORRECTION

PATENT NO. : 5,141,753
DATED : August 25, 1992
INVENTOR(S) : Henri Kalervo Virtanen et al It is certified that error appears in the above-indentified patent and that said Letters Patent is hereby corrected as shown below:

In the title page:

[54], third line, "CREATED IN THE ELECTROYTIC" should read:

--CREATED IN THE ELECTROLYTIC--.

Column 1, line 3:

"THE ELECTROYTIC REFINING OF COPPER IN" should read:

--THE ELECTROLYTIC REFINING OF COPPER IN--.

Column 4, line 60:

"$As_2O_5$ 45 1%" should read: --$As_2O_5$ 45.1%--.

Column 6, line 10:

first word "woods" should read: --wood--.

Signed and Sealed this

Twenty-eighth Day of September, 1993

Attest:

BRUCE LEHMAN

*Attesting Officer*     *Commissioner of Patents and Trademarks*